(12) United States Patent
Heydlauf (10) Patent No.: US 10,887,555 B2
(45) Date of Patent: Jan. 5, 2021

(54) VISION SYSTEM FOR LABORATORY WORKFLOWS

(71) Applicant: Siemens Healthcare Diagnostics Inc., Tarrytown, NY (US)

(72) Inventor: Michael Heydlauf, Cary, NC (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 0 days.

(21) Appl. No.: 16/633,079

(22) PCT Filed: Aug. 8, 2018

(86) PCT No.: PCT/US2018/045718
§ 371 (c)(1),
(2) Date: Jan. 22, 2020

(87) PCT Pub. No.: WO2019/040283
PCT Pub. Date: Feb. 28, 2019

(65) Prior Publication Data
US 2020/0169699 A1    May 28, 2020

Related U.S. Application Data

(60) Provisional application No. 62/549,088, filed on Aug. 23, 2017.

(51) Int. Cl.
| | | |
|---|---|---|
| *G11B 13/00* | (2006.01) | |
| *H04N 7/00* | (2011.01) | |
| *G11B 11/00* | (2006.01) | |
| *G11B 11/20* | (2006.01) | |
| *H04N 7/18* | (2006.01) | |
| *G06K 9/00* | (2006.01) | |

(Continued)

(52) U.S. Cl.
CPC ......... *H04N 7/181* (2013.01); *G06K 9/00771* (2013.01); *G06T 11/206* (2013.01); *G08B 5/22* (2013.01)

(58) Field of Classification Search
USPC ........ 348/42, 52, 61, 36, 25, 208.15, 207.99
See application file for complete search history.

(56) References Cited

U.S. PATENT DOCUMENTS

| | | | |
|---|---|---|---|
| 6,801,662 B1 | 10/2004 | Owechko et al. | |
| 6,809,887 B1 * | 10/2004 | Gao | G02B 13/06 348/48 |

(Continued)

OTHER PUBLICATIONS

International Search Report for PCT/US2018/045718 dated Oct. 25, 2018.

*Primary Examiner* — Daquan Zhao (57) ABSTRACT

A depth-sensitive system for monitoring for and detecting a predefined condition at a specific location within a visually monitored portion of an area. Plural depth-sensitive cameras are oriented with respect to the area whereby each camera has a field of view within the area that at least partially overlaps with the field of view of another of the plural cameras. The combined field of view encompasses all portions of interest of the area. A system for providing a notification of the visual detection of a predefined condition at a particular location or set of locations within an area of interest is provided, as is a system for generating a visual representation of human activity at one or more specific locations within an area of interest.

27 Claims, 5 Drawing Sheets

(51) Int. Cl.
  *G06T 11/20*   (2006.01)
  *G06T 11/60*   (2006.01)
  *G08B 5/22*    (2006.01)

(56) References Cited

U.S. PATENT DOCUMENTS

| | | |
|---|---|---|
| 8,253,792 B2 | 8/2012 | Wells et al. |
| 8,817,094 B1 | 8/2014 | Brown et al. |
| 8,885,047 B2 | 11/2014 | Golan et al. |
| 2003/0093200 A1* | 5/2003 | Gutta ............... G08B 13/19602 701/45 |
| 2006/0028552 A1* | 2/2006 | Aggarwal .......... G06K 9/00295 348/169 |
| 2013/0182114 A1 | 7/2013 | Zhang et al. |
| 2014/0148733 A1 | 5/2014 | Stone et al. |
| 2015/0022630 A1 | 1/2015 | Shafir |
| 2015/0120237 A1* | 4/2015 | Gouda ................... G01C 21/00 702/150 |
| 2015/0179219 A1 | 6/2015 | Gao et al. |
| 2015/0294143 A1 | 10/2015 | Wells et al. |
| 2016/0125341 A1 | 5/2016 | Duckenfield et al. |
| 2016/0140397 A1 | 5/2016 | Zhang et al. |
| 2016/0253740 A1 | 9/2016 | Goulart |
| 2016/0284075 A1* | 9/2016 | Phan .................. G06K 9/00664 |

\* cited by examiner

VISION SYSTEM FOR LABORATORY WORKFLOWS

CROSS-REFERENCE TO RELATED APPLICATIONS

This patent application claims priority of U.S. Pat. Appl. No. 62/549,088, filed Aug. 23, 2017, the disclosure of which is hereby incorporated in its entirety by reference.

FIELD OF THE DISCLOSURE

The disclosure herein relates generally to the field of depth-sensitive vision systems and the use of such systems in detecting and responding to depth-specific activity within an area of interest.

BACKGROUND

In a variety of instances, it is desirable to enable automated monitoring of activity within an area of interest. To achieve this goal, automated analysis of image data has heretofore relied upon the output of still or traditional video cameras. While the image data of such systems may provide coverage of a portion of an area of interest, the determination of where an item, person, or action of interest is located within the area is at best a rough approximation in the absence of depth-perception capabilities. Thus, prior approaches to monitoring areas of interest have provided inferior spatial resolution.

As a result, automated area monitoring has been hampered by an inability to derive high degree of accuracy, location-specific detection. For example, in the context of a laboratory environment, it may be desirable to automatically detect when a sample tray exits an instrument, indicating completion of a required analysis. If there are plural instruments within the field of view of an optical system according to the prior art, an image processing system may be able to differentiate between instruments based upon azimuthal location. However, if multiple instruments are disposed along a particular view angle, it may be difficult or impossible to determine which instrument has produced the sample tray.

In another example, it may be desirable for an automated system to ensure safe conditions are maintained within a work environment by optically monitoring the environment for the appearance of an object or condition. According to the prior art, hazards such as liquid spills may be detectable, but may not be specifically locatable due to an inability to accurately determine the distance of occurrence of a spill. The lack of specific location information may thus prevent such an automated system from deriving possible sources of the spill or the nature of the spill.

Certain work environments may be segregated into discrete portions, each with a respective level of authorization required for entry. Traditional vision systems do not provide the accuracy required to automatically detect with a high degree of accuracy the location of or path followed by personnel within the work environment.

An automated optical system may have utility in policing certain work rules with respect to a given workspace. For example, it may be prohibited for a worker to drive a vehicle such as a forklift within a workspace having fragile instruments. Or, in another example, only personnel of a given degree of certification may drive such a vehicle within the workspace. Traditional vision systems do not provide adequate spatial resolution for determining whether an activity such as the crossing of a particular workspace boundary by unauthorized personnel has occurred.

It may be desirable for the state of an object within an environment to be monitored. In a crowded workspace such as a manufacturing floor, a traditional vision system may not provide sufficient spatial resolution for automated monitoring and equipment control. Failure to stop the correct machine due to a jam or error may be costly and may compound existing error conditions.

Traditional automated vision systems also provide insufficient visual resolution for accurate monitoring and recordation of the movement of one or more individuals within a work environment, including data relating to general foot traffic with a space, the paths taken by one or more individuals, or a measure of dwell times within the space by all individuals or by select individuals. Such data may have utility in optimizing the layout of equipment, in diagnosing or predicting equipment error states, in detecting improper execution of work tasks, and in assessing the work performance of one or more individuals.

It would thus be desirable to have a vision system enabling high spatial resolution monitoring of a work area for a variety of automated applications.

SUMMARY

In order to overcome the inability of the prior art to accurately provide spatial context to video data gathered with respect to an area of interest such as a laboratory, manufacturing floor, office space, or other area, the presently disclosed invention provides a depth-sensitive system for monitoring for, detecting, and identifying a predefined condition at a specific location within a visually monitored portion of the area. Plural depth-sensitive cameras are oriented with respect to the area whereby each camera has a field of view within the area that at least partially overlaps with the field of view of another of the plural cameras. The combined field of view encompasses all portions of interest of the area.

According to a first aspect of the present disclosure, a system for providing a notification of the visual detection of a predefined condition at a particular location or set of locations within an area of interest is provided. The system includes plural depth-sensitive video cameras and a video receiver in communication with each of the video cameras for receiving depth-specific video data from each camera and for associating metadata with the video data. A database of predefined detection rules is provided, each rule defining video data parameters required to detect the respective, predefined condition. A video processor is provided for analyzing the depth-specific video data and metadata in conjunction with the predefined detection rules in order to selectively detect the occurrence of at least one predefined condition at a specific location or set of locations within the area of interest. A notification unit responds to the video data analysis and selectively provides an indication whether a predefined condition has been detected at a specific location within the area of interest.

Such a system enables highly accurate spatial detection of one or more conditions within the area of interest, thereby enabling a variety of response modalities, depending upon the nature of the condition detected. For example, the condition may be the appearance of smoke, water, and/or fire within a workspace. Through the use of high accuracy spatial location, the urgency of response may be tuned according to a known distribution of assets, equipment, or fuel sources with respect to the detected condition. In another example, the condition may be the appearance and identification of an object, such as a sample tray output by a laboratory analyzer at a specific location. This event may be a predicate to further processing for the sample or may enable other samples to then be processed by the same analyzer. By spatially locating, detecting, and analyzing the completed sample, greater laboratory efficiencies are enabled. Absent depth-sensitive video cameras and the depth-specific output they provide, the foregoing functionality would not be enabled.

According to second aspect of the present disclosure, a system for generating a visual representation of human activity at one or more specific locations within an area of interest is provided. The system includes a plurality of depth-sensitive video cameras, each having a respective field of view within the area of interest, each field of view at least partially overlapping with the field of view of at least one other depth-sensitive video camera. A video receiver is in communication with each of the depth-sensitive video cameras for selectively receiving depth-specific video data from each video camera and for associating metadata with the video data. A database of predefined detection rules is provided, each rule defining video data parameters required for detecting the presence and location of at least one human within the area of interest over time. A video processor in communication with the video receiver and database of predefined detection rules is also provided for analyzing the depth-specific video data for selectively detecting the presence and location within the area of interest of at least one human over time and for generating a record of the presence and location data as a record of human activity over time within the area of interest. A notification unit in communication with the video processor selectively generates a graphical representation of the record of human activity over time within the area of interest.

The foregoing system enables the recording of a spatially accurate record of human activity within a workspace, leading to a variety of benefits and efficiencies. Manual tracking of plural humans within an operator may be attempted manually, but is inevitably inaccurate, particularly if multiple humans are being tracked simultaneously. Current approaches to automatic tracking suffer for an inability to spatially locate people with a high degree of accuracy. Absent the precision enabled by the presently disclosed system, the associated efficiencies are unattainable. With the disclosed, spatially-sensitive system for detecting human activity, an automated, accurate record of human activity is enabled, which may lead to more efficient distribution of equipment or assets, improved task assignment, or the detection of improper work flows or equipment inadequacies.

BRIEF DESCRIPTION OF THE DRAWINGS

Illustrative embodiments of the disclosed technology are described in detail below with reference to the attached drawing figures, which are incorporated by reference herein and wherein.

DETAILED DESCRIPTION

Disclosed herein is a depth-sensitive video system for use in monitoring the status of and activity within a respective workspace. A wide variety of workspaces may benefit from use of the disclosed video system, including without limitation laboratory environments, manufacturing floors, offices, and medical environments.

The video system is predicated on the use of plural depth-sensitive video devices, such as the Microsoft KINECT motion sensing input device. The plural devices are disposed about a workspace to provide overlapping field of view coverage of a designated area to be monitored. The plural video devices provide input to a video processor capable of integrating the plural inputs into a comprehensive video record of the workspace, in which specific actions, occurrences, and people are locatable within the workspace with a high degree of specificity.

Figure 1:
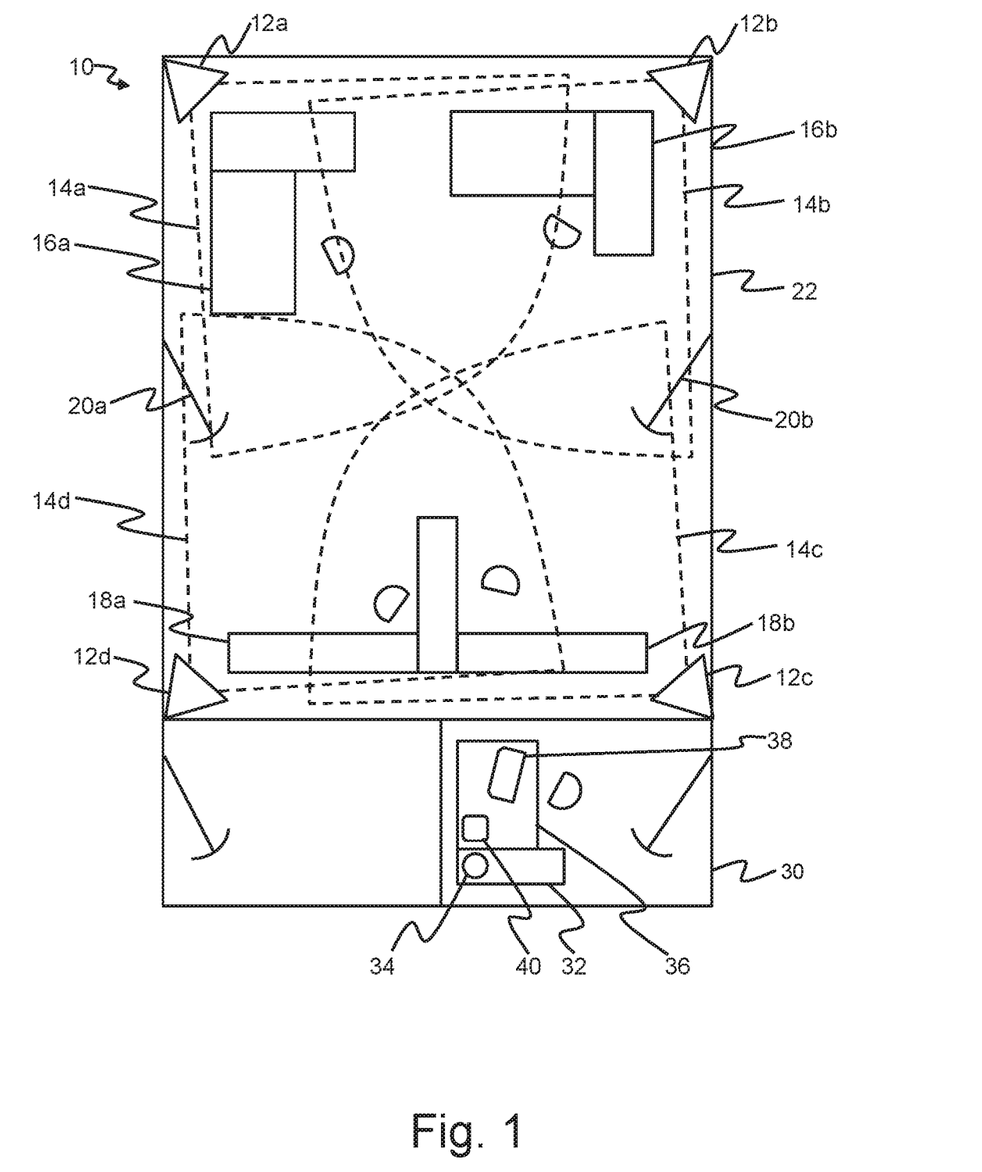
FIG. 1 is a plan view of a depth-sensitive video system disposed in conjunction with a workspace according to the invention.
Figure 2:
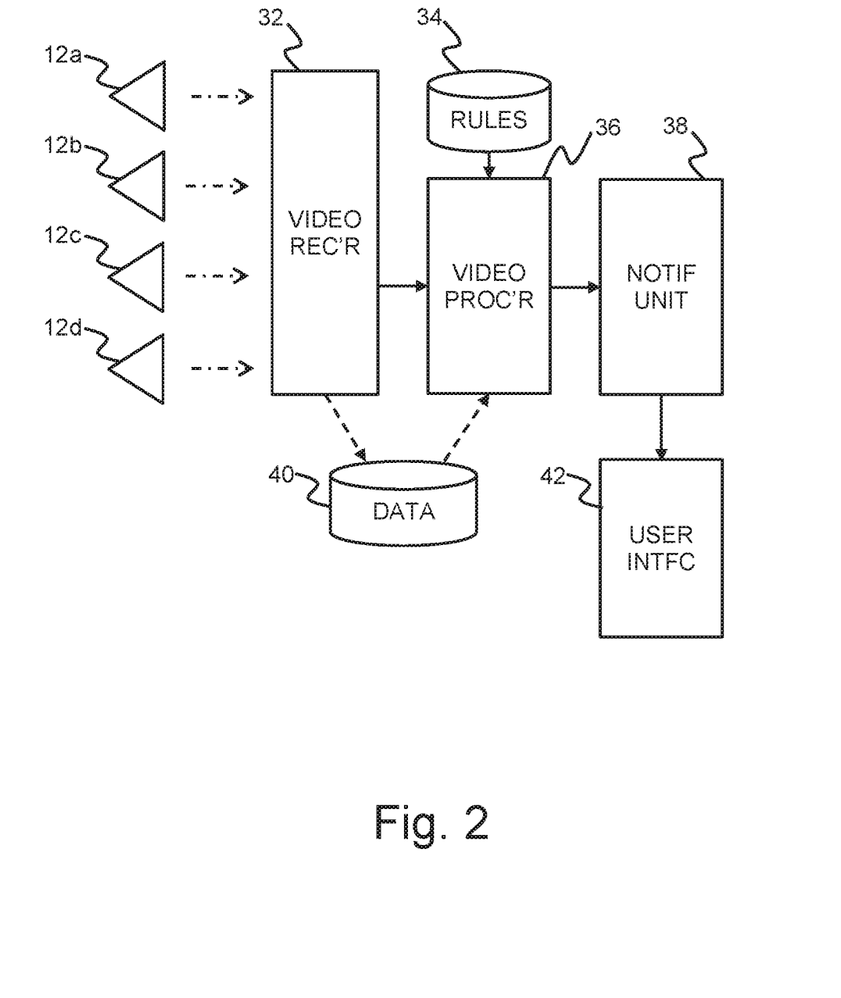
FIG. 2 is a block diagram of an embodiment of the depth-sensitive video system of FIG. 1.

FIG. 1 provides an example of a workspace 22 having the depth-sensitive video system 10 integrated therein. FIG. 2 provides a schematic representation of the same system elements. In the illustrated embodiment, plural depth-sensitive video cameras 12a, 12b, 12c, 12d are installed, each in a respective corner of the workspace. The video cameras are alternatively referred to herein as video devices. Each video camera has a respective field of view 14a, 14b, 14c, 14d. A portion of each field of view overlaps with at least one other depth-sensitive video camera field of view. Ideally, the video cameras are oriented with respect to the workspace such that the total field of view of the plural video cameras encompasses all portions of the workspace that are of interest.

Disposed within the workspace 22 in this illustrated embodiment as physical assets are two laboratory analytical instruments 16a, 16b and two workstations 18a, 18b. If it is desired to monitor activity with respect to these instruments and workstations, then the field of view 14a, 14b, 14c, 14d of at least one of the depth-sensitive video cameras 12a, 12b, 12c, 12d must encompass each such instrument and workstation. In addition, if it is desired to monitor the entrances and exits of a workspace, then the field of view of at least one such video camera must also encompass the doors 20a, 20b of the workspace.

The depth-sensitive video cameras 12a, 12b, 12c, 12d communicate with a video receiver 32 and provide depth-specific video data from the respective field of view thereto. This communication may be wired (i.e., via copper conductors or optical fibers) or wireless, such as according to the Bluetooth communications standard or Wi-Fi or Li-Fi technology. Each video camera may be battery powered or preferably hard-wired to a source of electrical power.

The video receiver 32 is configurable to selectively receive depth-specific video data from the video cameras 12a, 12b, 12c, 12d and to integrate the video data with metadata such as the time the video data was acquired. Time data may be based upon a clock internal to the video receiver or may be received from an external source. In alternative embodiments, the metadata integrated with the video data by the video processor may include the location of the respective video device. Location, in this context, may be an absolute location, such as defined according to GPS coordinates, or a relative location, such as defined with respect to one or more portions of the respective workspace or some other predefined landmark(s). The metadata may also include a unique identifier of the respective video camera, such as a model number and/or serial number.

Further, the metadata may include data characterizing the field of view of each respective video camera. For example, the metadata may include a direction, relative or absolute, where the center of the respective field of view is pointing in azimuth and/or elevation. A relative pointing direction may be with respect to the respective workspace or an area of interest therein. Elevation may be defined with respect to a horizontal plane coincident with the floor of the respective workspace.

The metadata may also include a definition of the angular scope of the field of view in azimuth and/or elevation measured, for example, in a number of degrees with respect to the center of the respective field of view to the edge of the field of view.

The video receiver 32 selectively provides all or portions of the video data received from the depth-sensitive video cameras 12a, 12b, 12c, 12d, or may generate composite depth-specific video data of at least a portion of the area of interest 22 from the depth-specific video data of each of the plural video cameras. The composite video data may integrate the video data of two or more video cameras, such as on a pixel by pixel basis.

The video system 10 of FIGS. 1 and 2 further comprises a database of predefined detection rules 34. Each detection rule stored within this database defines one or more video data parameters required to be met in video data from one or more of the depth sensitive video cameras for a respective action, occurrence, or person to be detected and optionally identified, as will be described in greater detail, below.

A video processor 36, in communication with the video receiver 32 and the database of predefined detection rules 34, receives the depth-specific video data of the plural depth-sensitive video cameras 12a, 12b, 12c, 12d as well as the associated metadata from the video receiver. Also selectively received are detection rules from the database of predefined detection rules, depending upon the desired analysis of the video data to be performed by the video processor. The video processor then analyzes the depth-specific video data and associated metadata according to predefined detection rules from the database of predefined detection rules for selectively detecting the occurrence of at least one predefined condition associated with the respective detection rules at a specific location within the workspace 22. Occurrences of a condition, in this context, is to be read broadly and is intended to encompass, without limitation, the occurrence of an action, appearance of an object, the identity of the object, and entrance, movement, and/or exit of a person within the respective workspace. Specific examples are provided below.

The video data received by the video processor may be some or all of the original depth-specific video data from the video cameras 12a, 12b, 12c, 12d, or may be a composite thereof generated by the video receiver 32. Alternatively, the video processor 36 may receive some or all of the original video data from the video cameras, with or without the associated metadata, and may generate the composite video data itself, wherein data associated with each pixel in plural video camera data streams are stored as a unified data structure with an identification of the location of the respective data within the workspace 22 in absolute terms or relative terms with respect to the workspace itself If the video data from the video receiver 32 is composited, either by the video receiver or the video processor 36, the latter analyzes the composited video data on the basis of the predefined detection rules for selectively detecting the occurrence of a predefined condition at a specific location within the workspace 22.

A notification unit 38 is in communication with the video processor 36. The result of the analysis of the video data by the video processor on the basis of the predefined detection rules may require, according to those rules, the provision of an indication to a user that a predefined condition has been detected at a specific location within the workspace 22. The predefined condition may be, for example, that a certain action or activity being monitored for has occurred at a specific location or locations within the workspace, that a predefined event has occurred at the specific location or locations within the workspace, that a predefined object has been identified at a specific location or locations within the workspace, that any person or a specific person has been detected at a specific location or locations within the workspace, or that a physical object at a specific location or locations within the workstation has a particular state or a state within a predefined set of states. The predefined rules from the database of predefined detection rules 34 define the video analysis to be performed by the video processor on the video data, as well as the set of expected, allowed, or condition-defining parameters against which the analysis results are compared, in order to assess the respective, predefined condition.

The appearance or identification of a predefined object at a specific location within the workspace 22 may include the identification of, for example, the delivery of an object at a specific location, the appearance of one or more of smoke, fire, and water at a specific location or locations, and the appearance of a visual warning or alert indication at a specific location or locations. These are intended as merely non-limiting examples.

The appearance of a person at a specific location may include the detection of a specific person at a specific location or locations within the workspace 22, the detection of an unauthorized person or a person having insufficient privileges to be at one or more locations within the workspace, or the detection of an unidentified person at one or more specific locations within the workspace.

The determination of the entry of a specific person by the video processor 36 may be achieved through the application of biometric analysis techniques with respect to the depth-specific video data associated with the specific location, the video data being that of one depth-sensitive video camera 12a, 12b, 12c, 12d or composite video data from multiple video cameras from the video receiver 32 or video processor 36 itself. Parameters identifying the specific individual may be provided by the database of predefined detection rules 34.

The detection of the entry of an unauthorized person or a person having insufficient privileges to be at the one or more locations within the workplace 22 may include the detection from the depth-specific video data of a person intentionally obscuring their identity through the inability of the video processor 36 to successfully apply biometric analysis techniques. Further, the detection of an unauthorized person or person having insufficient privileges may include the detection of an underage person, a person failing to present or have required credentials, or a person whose entry would result in a maximum capacity for the workspace or for a respective location being exceeded. Parameters enabling the detection of such persons may be provided by the database of predefined detection rules 34.

The detection of an action or activity at a specific location within the workspace 22 may include detecting, by the video processor 36, the entry or appearance of a person not having required clothing or equipment at the specific location, a person making a particular gesture indicative of a need for help or assistance at the specific location, an activity being performed in an unapproved manner at the specific location, and an improper physical interaction between persons at a specific location. Parameters enabling the detection of such action or activities may be provided by the database of predefined detection rules 34.

The particular state of a physical object at a specific location may include the existence of a physical hazard at the specific location, the existence of an improper equipment configuration at a specific location, the existence of a security violation at a specific location, and the existence of a physical indication that equipment at a specific location requires maintenance. Parameters enabling the detection of these states may be provided by the database of predefined detection rules 34.

The user indication provided by the notification unit 38 may be one or more of an alert indication appearing to an operator interfacing with a workplace automation software platform, an instant message, an audible tone or signal, a visible signal, a vibratory signal, a telephone call, a fire alarm, a text message, or an email message. Thus, the notification unit may have an appropriate interface, such as an internet, wireless, telephony, or other interface for implementing the notification function as required. While illustrated as a discrete unit or device, the functions of the notification unit may be integrated into those carried out by the video processor 36.

The video system 10 of FIGS. 1 and 2 may further include an electronic storage unit 40 in communication with the video receiver 32 for selectively storing the depth-specific video data from the plural depth-sensitive video cameras 12a, 12b, 12c, 12d and the associated metadata via the video receiver. The storage unit may enable long-term storage of the video data such as for future audit purposes. The storage unit may also facilitate the transfer of data between the video receiver and the video processor 36. The same storage unit may also be useful as data storage space for the video processor during and subsequent to analysis of the video data.

In the illustrated embodiment of FIG. 1, the workspace 22 is a laboratory. However, the depth-sensitive video system 10 may be installed with respect a variety of workspaces, including without limitation manufacturing floors, office spaces, and public spaces. Further, while the detection of at least one condition at a specific location is referenced herein, it is understood that the phrase "a location" may also be a reference to a collection of adjacent locations, or even a set of displaced, noncontiguous but related locations.

Figure 3:
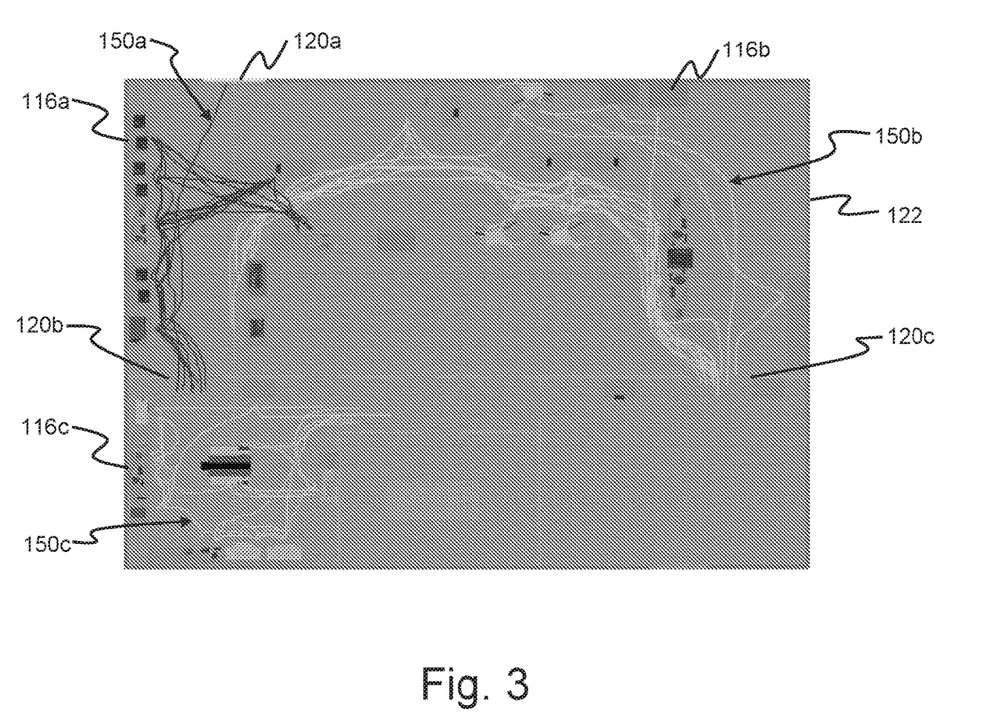
FIG. 3 is a plan view of a workspace overlaid with spaghetti diagrams of personnel movement within the workspace generated by the depth-sensitive video system of FIG. 1.

The depth-sensitive video system 10 of FIGS. 1 and 2 also finds application in the context of a system for generating a visual representation of human activity at one or more specific locations within an area of interest such as a workplace or public space. FIG. 3 provides a plan view of a workspace 122 overlaid with spaghetti diagrams reflecting the movement of multiple persons within the workspace. While not illustrated in FIG. 3, plural depth-sensitive video cameras 12a, 12b, 12c, 12d such as illustrated in FIGS. 1 and 2 would be positioned with respect to the workspace in FIG. 3, each of the plural video cameras having a respective field of view that at least partially overlaps with the field of view of at least one other of the plural video cameras. Any number of cameras may be employed in the presently disclosed embodiments as long as there are two or more and as long as the respective fields of view at least partially overlap thus providing coverage of the area of interest.

Also utilized in this system for generating a visual representation is the video receiver 32 as described above with respect to FIGS. 1 and 2. Specifically, the video receiver is in communication with each of the plural depth-sensitive video cameras 12a, 12b, 12c, 12d and receives depth-specific video data from each of the video cameras. The video receiver associates metadata with the video data, as previously described.

The previously discussed database of predefined detection rules 34 includes for this application of the video system 10 rules for defining video data parameters required for detecting the presence and location of at least one human over time. These rules define characteristics of video data, including image size, shape, and color, necessary for the detection of a human at a specific location or locations associated with the respective quantum of video data. In certain embodiments, the rules may further enable the differentiation between specific humans, such as by application of biometric analysis to the video data, or the differentiation between discrete classes of humans, such as through the optical detection of unique class-based indicia such as identification cards or uniform color.

The electronic data storage unit 40 may be employed in one embodiment to enable depth-specific video data from each of the depth-sensitive video cameras 12a, 12b, 12c, 12d via the video receiver 32 to be recorded prior to processing by the video processor 36. The same storage unit may also be useful as data storage space for the video processor during and subsequent to analysis of the video data.

The video processor 36 is in communication with the video receiver 32 and the database of predefined detection rules 34 for analyzing the depth-specific video data provided by the depth-sensitive video cameras 12a, 12b, 12c, 12d for selectively detecting the presence, identity, and location of at least one human over time within the workspace or area of interest 22. In other words, the video processor is capable of analyzing the location-specific video data from the video receiver, apply the detection rules from the rules database, and determine whether the detection rules are met for each location within the workspace 22, or within groups of proximate workspaces as the detection rules may require a positive detection among plural proximate or adjacent locations in the video data in order for the video processor to establish that a human is present.

In accordance with the alternative rules embodiments discussed above, the video processor 36 may also selectively detect the presence of one or more unique individuals within the workspace 22 on the basis of biometric analysis of the depth-specific video data using recognition parameters defined within the database of predefined detection rules 34. Alternatively, the video processor may selectively detect the presence of each of one or more humans of certain classifications within the workspace.

In addition to detecting humans at respective specific locations within the workspace 22, the video processor 36 is capable of accumulating the detection of each human over time as each human enters the collective field of view of the depth-sensitive video cameras 12a, 12b, 12c, 12d, traverses the workspace, and/or exits the workspace. The accumulated detections over time, for all humans and/or for each human, enable several useful outputs. For context, the outputs may include or be with respect to a graphical rendering of the respective workspace, including instruments 16*a*, 16*b* or workspaces 18*a*, 18*b* of interest or particular relevance.

First, a history or track of each human within the workspace 22, 122 versus time may be defined by the video processor 36 for a given time period. Such a track, for each individual, may then be used by the notification unit 38 to present a graphical representation of the path(s) taken or location(s) of each human within the workspace. This kind of a graphical representation, shown in FIG. 3, is known as a spaghetti diagram. Each human traversing the workspace 122 within a given time period would then have a corresponding spaghetti diagram track 150*a*, 150*b*, 150*c* generated by the notification unit on the basis of the video processor 36 output. Each track may have a respective color for ease of differentiation between tracked individuals.

In the case where the database of predefined detection rules 34 provides rules for differentiating between individual humans, the video processor 36 output would enable the notification unit 38 to provide a spaghetti diagram path 150*a*, 150*b*, 150*c* for each such human. Note that differentiating between humans may enable the video processor to identify unique individuals, or may simply enable the video processor to differentiate between generic individuals, depending upon the needs of the respective system and the programming of the database of predefined detection rules 34.

Spaghetti diagrams such as shown in FIG. 3 are an important part of lean manufacturing/lean enterprise and Six Sigma, common efficiency frameworks utilized in laboratories, manufacturing environments, and other workspaces. Rather than creating lean diagrams by hand, a tedious and cumbersome process, the disclosed system 10 is capable of tracking individuals and automatically and accurately generating spaghetti diagrams. If later analysis of resulting spaghetti diagrams reveals that a particular individual, assigned a certain task or class of tasks, spends a significant amount of time traversing between pieces of equipment 116*a*, 116*b*, 116*c*, the layout of equipment within the respective workspace may be determined to be inefficient, resulting in a need for an updated, optimized layout.

Another use of spaghetti diagrams may be for detecting whether a given piece of equipment 116*a*, 116*b*, 116*c* is receiving an adequate or required amount of attention. If the resulting diagram reveals that none of the human tracks pass by a given piece of equipment, and the standard operating protocol for that piece of equipment indicates operator intervention is periodically required, additional training may be required.

The notification unit or other user interface providing the spaghetti diagrams may enable an operator to select or adjust the time period of the respective display.

The depth-sensitive video system of FIG. 1 may be installed in conjunction with the workspace 122 depicted in FIG. 3 and may be used to provide a track of each individual within the workspace. Alternatively, individuals may be assigned to tasks only within certain portions of the workspace. In this case, the video processor 36 may be programmed, on the basis of the database of predefined detection rules 34, to spatially restrict the detection of each individual within the workspace 22. Thus, the individual whose track is designated 150*a* in FIG. 3 is recorded only once they have passed through doorways 120*a* and 120*b*. On the other side of the second doorway 120*b*, the individual whose track is designated 150*c* is recorded. Likewise, the individual whose track is designated 150*b* is only recorded once they have passed through doorway 120*c*. These location-specific limitations may serve the purposes of providing only the information required for performance management or equipment layout auditing, and may reduce the amount of data storage required for the spaghetti diagrams.

Figure 4:
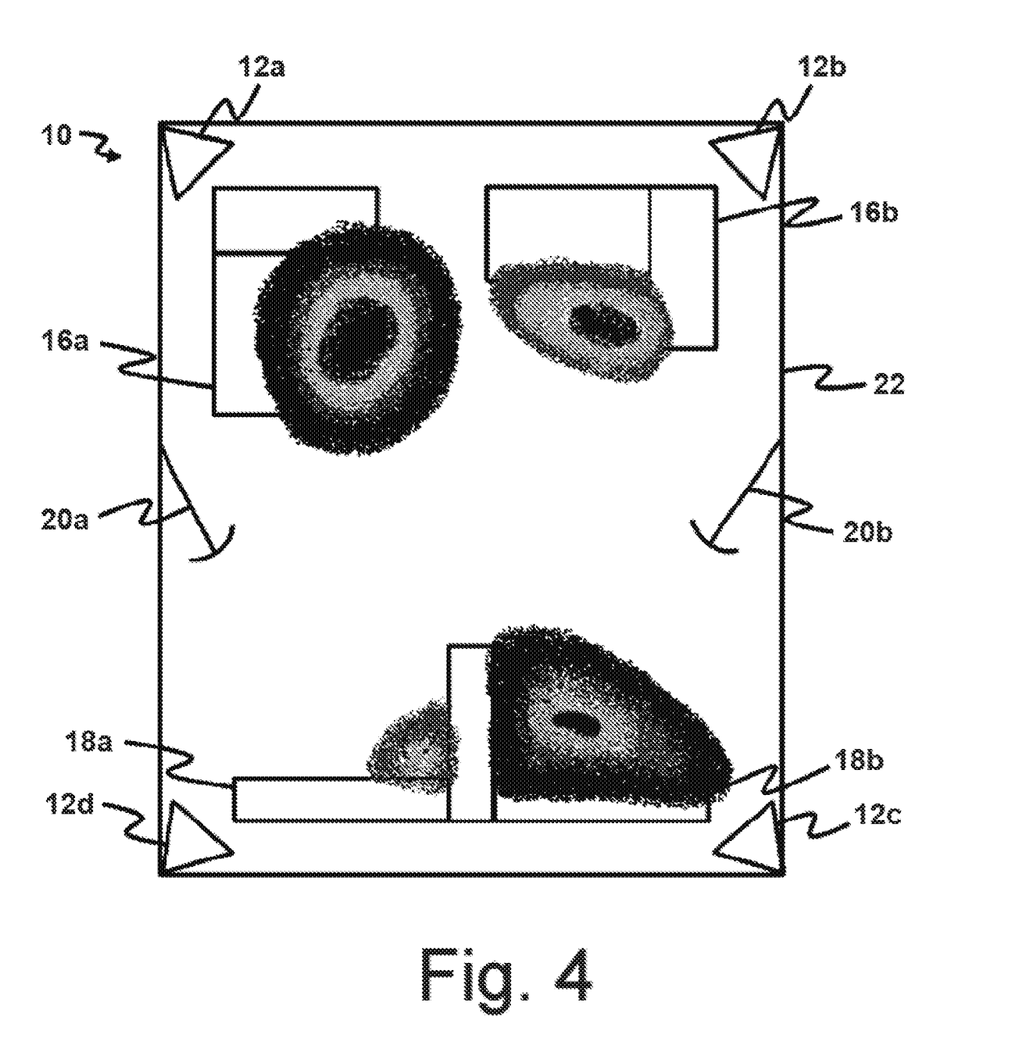
FIG. 4 is a plan view of the workspace of FIG. 1 overlaid with a heat map of personnel dwell time within the workspace generated by the depth-sensitive video system of FIG. 1.

In another embodiment illustrated with respect to FIG. 4, the video processor 36 output may enable the notification unit 38 to generate a heat map of the workspace 22 of FIG. 1. A heat map is a two-dimensional graphical representation of data in which numerical values are represented by colors. The video processor 36, operating in response to the rules defined within the database of predefined detection rules 34, may generate a heat map of the workspace on the basis of detected human activity.

In one embodiment, all human activity is considered together. Thus, the heat map of FIG. 4 may provide a graphical representation of where and for how long all humans were within the workspace 22. It is apparent from FIG. 4 that humans were primarily proximate a first instrument 16*a* and a second workspace 18*b*, with less time spent adjacent second instrument 16*b*, and little time spent at a first workspace 18*a*. Alternatively, a respective heat map may be generated by the video processor 36, on the basis of the depth-specific video data from the video receiver 32, originated by the depth-sensitive video cameras 12*a*, 12*b*, 12*c*, 12*d*, and of the database of predefined detection rules 34, for each differentiated human. Discrete colors or color pallets may be assigned to each of multiple humans in order to more readily differentiate between the activity of each individual. In either embodiment, the respective heat map would be with respect to a given temporal aspect.

The notification unit or other user interface providing the heat maps may enable an operator to select or adjust the time period of the respective display.

Heat map information may be used to improve workspace workflows and efficiencies. In addition, it can be used to identify issues within the workspace, such as why technicians or operators are spending so much time in front of one instrument, but not another. Likewise, the resulting heat maps may reveal that an instrument, workspace, or other asset is not being attended to according to pre-established requirements.

While reference has been made to the tracking of humans within an area of interest, it is intended that the disclosed systems find the same utility with respect to animals or objects such as vehicles.

Figure 5:
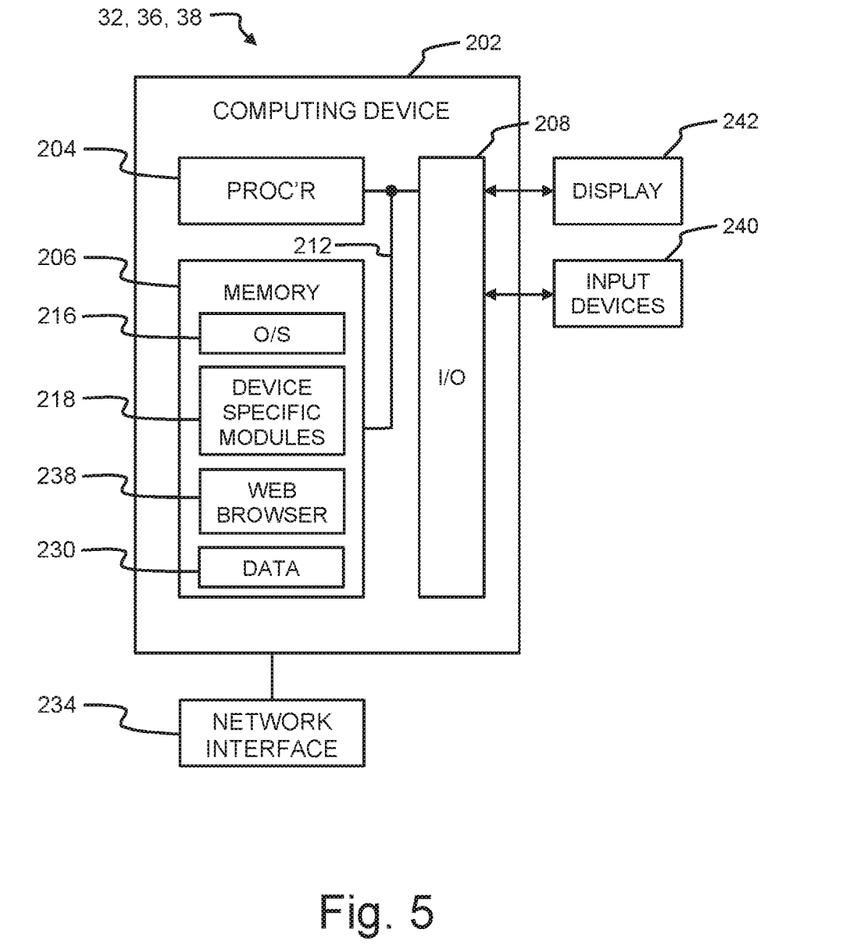
FIG. 5 is a schematic diagram of one exemplary embodiment of a computing device that may embody one or more of the components of the depth sensitive video system of FIG. 1.

The video receiver 32, video processor 36, and/or notification unit 38 may be implemented as discrete modules, as depicted in FIGS. 1 and 2. However, the discrete functions of each device may be implemented in combination within one or two computing devices, as known to one skilled in the art. An example of such a computing device 202 is depicted in FIG. 5 and is described in the following.

The computing device 202 has a processor 204, a memory 206, and I/O circuitry 208 suitably interconnected via one or more communications buses 212. The computing device 202 is connected to a source of power (which may include an internal battery) (not shown), and may further be connected to a back-up power supply device to prevent failure in the event of power outages. The system memory 206 may include read only memory (ROM), random access memory (RAM), and storage memory. The storage memory may include hard disk drives for reading from and writing to a hard disk, a magnetic disk drive for reading from or writing to a removable magnetic disk, and an optical disk drive for reading from or writing to a removable optical disk, such as a CD, DVD, or other optical media. The storage memory and their associated computer-readable media provide non-volatile storage of computer readable instructions, data structures, program modules, and other data for the computing device 202. Other types of computer readable media which can store data that is accessible by a computer, such as flash memory cards, DVD-ROM, DVD-RAM, and the like, may also be used in the exemplary computing system.

The memory 206 stores an operating system 216 for controlling the operation of the computing device 202. In one embodiment of the disclosure, the operating system 216 provides a graphical operating environment, such as Microsoft Corporation's WINDOWS, LINUX, or Apple's SNOW LEOPARD graphical operating system in which activated applications, programs, or modules are represented as one or more graphical application windows with an interface visible to the user, such as a graphical user interface (GUI). The memory 206 also stores a number of program modules 218. If the computing device is only implementing the functions of the video receiver 32, then the device specific modules 218 include a video receiver module for performing the video receiver functions described above. Likewise, if the computing device is implementing either the video processor 36 or the notification unit 38, the device specific modules 218 include a video processor module and a notification unit module, respectively. As noted, more than one module may be implemented by the same computing device as long as the appropriate device specific module(s) is provided.

Further, the memory 206 may also contain as a device specific module storage for and a program module for the database of predefined detection rules 34. Likewise, the memory may have additional storage capacity to implement the electronic data storage unit 40.

As shown in FIG. 5, the computing device 202 also includes a network interface 234 comprising one or more components for communicating with other devices, e.g., control panels, cell phones, PDA's, laptop computers, network terminals, general purpose computing devices, desktop computers, etc., over a wired and/or wireless network, such as a local area network (LAN) or a wide area network (WAN), such as the Internet. As known to those skilled in the art and others, the computing devices illustrated in FIG. 5 may be configured to exchange files, commands, and other types of data over one or more networks. However, since protocols for network communication, such as TCP/IP, are well known to those skilled in the art, those protocols will not be described here. Additionally or alternatively, the computing device may be equipped with a modem (not shown) for connecting to the Internet through a point to point protocol ("PPP") connection or a SLIP connection as known to those skilled in the art. For accessing the Internet, the memory 206 may further include a web browser module 238.

The computing device 202 may also include an output device in the form of a graphical display 242 and one or more input devices 240, such as a keyboard, touch pad, microphone, a pointing device, or the like, for inputting data into the computing device 202, such as changing settings, manually controlling components, responding to requests from execution of the program modules 218. The display 242 and the user input devices 240 are suitably connected through appropriate interfaces, such as serial ports, parallel ports, or a universal serial bus (USB) of the I/O circuitry. As would be generally understood, other peripherals may also be connected to the processor in a similar manner.

In one embodiment, the display 242 may include a touch sensitive layer on the screen that is configured to receive input from the user. In typical embodiments, the touch sensitive layer is configured to recognize a user's touches applied to the surface of the layer. For example, the position of the touches, the pressure of the touches, general direction of the touches, and the like are recognized by the touch sensitive layer. In one embodiment, the functionality of one or more inputs devices can be carried out by icons presented by the touch screen display and activated by an operator's finger, a stylus, etc. In another embodiment, the operator may interact with the virtual keyboard or keypad displayed on the display 242 via a finger, stylus, etc.

Input/Output circuitry 208 or other device level circuitry of the computing device 202 is connected in electrical communication with other components of the depth-sensitive vision system 10. In particular, data generating devices, such as the depth-sensitive video cameras 12a, 12b, 12c, 12d, communicate with the computing device 202 via one or more protocols known in the art. The Input/Output circuitry 208 is further connected in electrical communication with any controllable switches, relays, etc., of the various components that may be usefully controlled by the depth-sensitive video system as presently disclosed. In use, the Input/Output circuitry 208 or other device level circuitry is capable of receiving, processing, and transmitting appropriate signals between the processor 204 and these various components.

The program modules 218, when executed by the computing device 202, may present a graphical user interface to the operator, which may open within a web browser or other graphical environment. The program modules 218 are capable of graphically displaying information to and requesting and/or receiving data from the operator, analyzing data received, and generating alerts, notices, warnings, and/or graphical representations of data derived from the depth-sensitive video system 10, the latter particularly when the computing device 202 is implementing the functions of the notification unit 38. The program modules 218 may further access stored data 230, such as when the computing device also implements the electronic data storage unit 40.

Many different arrangements of the various components depicted, as well as components not shown, are possible without departing from the spirit and scope of the disclosed technology. Embodiments of the disclosed technology have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosed technology.

It will be understood that certain features and sub combinations are of utility and may be employed without reference to other features and sub combinations and are contemplated within the scope of the claims. Not all steps listed in the various figures need be carried out in the specific order described.

I claim:

1. A system for providing a notification with respect to visual detection of a predefined condition at a specific location within an area of interest, comprising:
    a plurality of depth-sensitive video devices, each having a respective field of view within the area of interest, each field of view having an overlapping portion with at least one adjacent field of view;
    a video receiver in communication with each of the plurality of video devices for selectively receiving depth-specific video data from each video device and for associating metadata with the video data, the metadata comprising a time of acquisition of the respective data and a characterization of the field of view of the respective video device;
a database of predefined detection rules, each detection rule defining video data parameters required for detecting a respective condition;
a video processor, in communication with the video receiver and the database of predefined detection rules, configured for analyzing the depth-specific video data and associated metadata according to the predefined detection rules to selectively detect the occurrence of at least one predefined condition at a specific location within the area of interest, the at least one predefined condition being selected from the group consisting of: the appearance of a visual warning indicator associated with equipment at a specific location within the area of interest, the existence of an improper equipment configuration at a specific location within the area of interest, and the existence of a physical indication that equipment at a specific location within the area of interest requires maintenance; and
a notification unit in communication with the video processor and responsive to the video data analysis for providing an indication that a predefined condition has been detected at a specific location within the area of interest.

2. The system of claim 1, wherein:
the video receiver is further for generating composite depth-specific video data of at least a portion of the area of interest from the depth-specific video data of each of the plurality of video devices; and
the video processor is further configured for analyzing the composite depth-specific video data according to the predefined detection rules to selectively detect the occurrence of the at least one predefined condition at a specific location within the area of interest.

3. The system of claim 1, further comprising an electronic data storage unit in communication with the video receiver for selectively storing the depth-specific video data and associated metadata from the plurality of video devices via the video receiver.

4. The system of claim 3, wherein the electronic data storage unit is further in communication with the video processor for selectively providing the selectively stored depth-specific video data and associated metadata for analysis according to the predefined detection rules.

5. The system of claim 1, wherein the metadata further comprises at least one of: the location of the respective video device; a unique identifier of the respective video device; the axial direction of the center of the field of view of the respective video device; and the elevation of the center of the field of view of the respective video device.

6. The system of claim 5, wherein the location of the respective video device is defined relative to the area of interest.

7. The system of claim 5, wherein the axial direction of the center of the field of view of the respective video device is defined with respect to the area of interest.

8. The system of claim 5, wherein the elevation of the center of the field of view of the respective video device is with respect to the floor of the area of interest.

9. The system of claim 1, wherein the characterization of the scope of the field of view of the respective video device is a number of degrees from the respective center of the field of view of the respective video device to the edge of the field of view of the respective video device.

10. The system of claim 1, wherein the video processor is further configured for analyzing the depth-specific video data and associated metadata to selectively detect, on the basis of the database of predefined detection rules, the occurrence of at least one predefined condition at a specific location within the area of interest, the at least one predefined condition being selected from the group consisting of: the appearance of an object at a specific location within the area of interest; the entry of a person at a specific location within the area of interest; the occurrence of an activity at a specific location within the area of interest; and a state of a physical object at a specific location within the area of interest.

11. The system of claim 10, wherein the appearance of an object at a specific location within the area of interest is selected from the group consisting of: delivery of an object at a specific location within the area of interest and the appearance of one or more of smoke, fire and water at a specific location within the area of interest.

12. The system of claim 10, wherein the entry of a person at a specific location within the area of interest is selected from the group consisting of: the entry of a specific person; the entry of an unauthorized person; and the entry of an unidentified person.

13. The system of claim 12, wherein the entry of a specific person is determined by the video processor performing biometric analysis on the depth-specific video data.

14. The system of claim 12, wherein the entry of an unauthorized person is selected from the group consisting of: a person intentionally obscuring their identity; an underage person; a person without required credentials; and a person whose entry would exceed a maximum number of people allowed within the area of interest.

15. The system of claim 10, wherein the occurrence of an activity at a specific location within the area of interest is selected from the group consisting of: entry of a person not having required clothing or equipment; a person making a gesture indicating a need for assistance at a specific location; an activity being performed at a specific location in an unapproved manner; and improper physical interaction between persons at a specific location.

16. The system of claim 10, wherein the state of a physical object at a specific location within the area of interest is selected from the group consisting of: the existence of a physical hazard at a specific location and the existence of a security violation at a specific location.

17. The system of claim 1, wherein the indication is selected from the group consisting of: an alert indication appearing in workplace automation software; an instant message; an audible signal; a visible signal; a telephone call; a fire alarm; a text message; and an email message.

18. A system for generating a visual representation of human activity at a specific location within an area of interest, comprising:
a plurality of depth-sensitive video devices, each having a respective field of view within the area of interest, each field of view having an overlapping portion with at least one adjacent field of view;
a video receiver in communication with each of the plurality of video devices for selectively receiving depth-specific video data from each video device and for associating metadata with the depth-specific video data, the metadata comprising a time of acquisition of the respective data and a characterization of the field of view of the respective video device;

a database of predefined detection rules, each detection rule defining video data parameters required for detecting the presence and location of at least one human over time;

a video processor in communication with the video receiver and the database of predefined detection rules, the video processor configured for analyzing the depth-specific video data to selectively detect, according to the predefined detection rules, the presence and location of at least one human over time within the area of interest and for generating a record of the presence and location data as a record of human activity over time within the area of interest, distinguishing between multiple humans within the depth-specific video data on the basis of the predefined detection rules from the database of predefined detection rules and associating a respective human identifier for each of the multiple humans within the graphical representation of the record of human activity; and a notification unit in communication with the video processor for generating a graphical representation of the record of human activity over time within the area of interest, wherein the record of human activity over time comprises data identifying, for each human within the area of interest, the location of the respective human within the area of interest versus time, and wherein the video processor is configured to spatially restrict the selective detection of the presence and location of each of the at least one human within the area of interest on the basis of the database of predefined detection rules.

19. The system of claim 18, wherein the graphical representation of the record of human activity is a spaghetti diagram.

20. The system of claim 18, wherein the respective human identifier for each human within the graphical representation of the record of human activity is a spaghetti diagram of a respective color.

21. The system of claim 18, wherein the graphical representation of the record of human activity is a heat map.

22. The system of claim 21, wherein the video processor is further for distinguishing between multiple humans within the depth-specific video data on the basis of the predefined detection rules of the database of predefined detection rules and for associating a respective human identifier for each of the multiple humans within the graphical representation of the record of human activity.

23. The system of claim 22, wherein the respective human identifier for each human within the graphical representation of the record of human activity is a respective heat map for each human.

24. The system of claim 18, wherein the record of human activity further comprises the location of each of plural physical assets at specific locations within the area of interest.

25. The system of claim 18, wherein the record of human activity further comprises data indicative of where and when each human entered the area of interest and indicative of where and when each human exited the area of interest.

26. The system of claim 18, further comprising an electronic data storage unit in communication with the video receiver for selectively storing the depth-specific video data and associated metadata from the plurality of depth-sensitive video devices and for selectively providing the stored depth-specific video data and associated metadata to the video processor.

27. The system of claim 18, wherein the graphical representation is a horizontal projection representation of the area of interest.

* * * * *